United States Patent [19]

Konno et al.

[11] Patent Number: 5,063,278

[45] Date of Patent: Nov. 5, 1991

[54] METHOD AND APPARATUS FOR SUPPLYING ELECTRIC POWER TO RESISTANCE WELDING GUN

[75] Inventors: Mitsuo Konno; Hisashi Noro; Naotero Katsura, all of Sayama, Japan

[73] Assignee: Honda Giken Kogyo Kabushiki Kaisha, Tokyo, Japan

[21] Appl. No.: 368,828

[22] Filed: Jun. 20, 1989

[30] Foreign Application Priority Data

Jun. 22, 1988 [JP] Japan .................... 63-153873
Jun. 22, 1988 [JP] Japan .................... 63-153874

[51] Int. Cl.$^5$ .................................. B23K 11/00
[52] U.S. Cl. .................................. 219/86.1
[58] Field of Search ............... 219/86.1, 86.25, 89, 219/86.8, 87; 437/836, 879

[56] References Cited

U.S. PATENT DOCUMENTS

| 2,254,914 | 9/1941 | Rugg | 439/819 |
| 2,286,980 | 6/1942 | Schanz | 219/87 |
| 2,481,844 | 9/1949 | Johnson | 219/87 |
| 3,925,635 | 12/1975 | Schneider | 219/89 |
| 4,531,041 | 7/1985 | Larsson | 219/89 |
| 4,551,903 | 11/1985 | Bisiach | 219/86.8 |
| 4,806,103 | 2/1989 | Kniese et al. | 439/636 |

FOREIGN PATENT DOCUMENTS

| 1173198 | 7/1964 | Fed. Rep. of Germany | 219/86.1 |
| 57-49079 | 2/1985 | Japan . | |
| 1089176 | 11/1965 | United Kingdom . | |
| 1075690 | 7/1967 | United Kingdom . | |

Primary Examiner—Clifford C. Shaw
Attorney, Agent, or Firm—Birch, Stewart, Kolasch & Birch

[57] ABSTRACT

A welding electric current is suppled to a tiltable resistance welding gun having a pair of electrodes which grip a workpiece while effecting resistance welding thereon. A power receiver terminal on the resistance welding gun and a power supply unit are connected to each other when the electrodes grip the workpiece therebetween, and the welding current is supplied from the power supply unit to the power receiver terminal. When the electrodes are separated from the workpiece, the power receiver terminal and the power supply unit are disconnected from each other.

13 Claims, 15 Drawing Sheets

METHOD AND APPARATUS FOR SUPPLYING ELECTRIC POWER TO RESISTANCE WELDING GUN

BACKGROUND OF THE INVENTION

The present invention relates to a method and an apparatus for supplying electric energy to a resistance welding gun, and more particularly to a method and an apparatus for supplying a welding current to a resistance welding gun mounted on a spot welding robot or the like, such that movement of the resistance welding gun will not be obstructed by a power cable and the current capacity will be increased.

To assemble an automotive body, it is general practice to join workpiece members in the form of thin metal sheets by spot welding. In recent years, such spot welding operation has been performed exclusively by spot welding robots.

A spot welding robot has a resistance welding gun comprising a pair of electrodes mounted on the distal ends of a pair of gun arms, respectively, movable toward and away from each other. Workpiece members such as thin metal sheets are gripped by the electrodes, and an electric current is passed between the electrodes across the thin metal sheets to join them to each other. Various types of resistance welding guns are known in the art. One type of resistance welding gun is swingable itself when the gun arms are moved toward and away from each other.

Such a resistance welding gun is disclosed in Japanese Laid-Open Utility Model Publication No. 57-49079 filed by the applicant. The disclosed resistance welding gun is shown in FIGS. 1 and 2 of the accompanying drawings.

As shown in FIGS. 1 and 2, the resistance welding gun, generally denoted at 2, has a support arm 6 fixed to a base 4 extending from a robot arm or the like and a bracket 8 swingably supported on the support arm 6 by means of a shaft 10. A fixed gun arm 12 is secured to the bracket 8, and an electrode 14 is mounted on the tip end of the fixed gun arm 12. An electrically conductive member 15 is fixed to the bracket 8 and has one end connected to the fixed gun arm 12. The other end of the conductive member 15 has a connector 15a projecting outwardly from the bracket 8. A compression spring 17 is connected between the connector 15a and the support arm 6.

A movable gun arm 16 of a bent shape is angularly movably supported on the bracket 8 in confronting relation to the fixed gun arm 12. An electrode 18 is mounted on the tip end of the movable gun arm 16, and a joint lever 20 is attached to the tail end of the movable gun arm 16. The joint arm 20 is operatively joined to a cylinder 22 which moves the movable gun arm 16 toward and away from the fixed gun arm 12. The cylinder 22 is fixedly mounted on the bracket 8 and has a piston 24 slidably disposed therein. A piston rod 26 coupled to and extending from the piston 24 has a distal end connected to the joint lever 20 through a pin 28. Another pin 30 is attached to the joint lever 20 in spaced relation to the pin 28. The pins 28, 30 ride in a J-shaped cam groove 32 defined in the bracket 8.

When the cylinder 22 is energized to move the piston 24 in the direction indicated by the arrow D in FIG. 1, the movable gun arm 16 is angularly moved in the direction indicated by the arrow B toward the fixed gun arm 12 while the pins 28, 30 are being guided in and along the cam groove 32. The compression spring 17 urges the bracket 8 to turn about the shaft 10 in the direction indicated by the arrow A, so that the fixed gun arm 12 is displaced toward a workpiece W. Finally, the workpiece W is gripped between the fixed gun arm 12 and the movable gun arm 16 as shown in FIG. 2.

The piston rod 26 has a step on a central region thereof, the step having a curved cam surface 34 as shown in FIGS. 1 and 2. When the piston 24 is displaced in the direction indicated by the arrow C in FIG. 2, the movable gun arm 16 is displaced in the direction indicated by the arrow A away from the workpiece W, and the cam surface 34 of the piston rod 26 abuts against a distal end 6a of the support arm 6. Since the piston 24 is allowed to move further in the direction indicated by the arrow C, the point at which the cam surface 34 engages the distal end 6a of the support arm 6 is shifted or displaced. The bracket 8 is turned as a whole in the direction indicated by the arrow B against the bias of the compression spring 17. As a result, the fixed gun arm 12 secured to the bracket 8 is moved away from the workpiece W, and resistance welding gun 2 is turned bodily in the direction indicated by the arrow B (see FIG. 1).

Since the resistance welding gun 2 is thus swung as a whole, it can be retracted away from the workpiece W. When the workpiece W is moved in a direction, for example, normal to the sheet of FIG. 1, to bring a new spot on the workpiece W between the electrodes 14, 18, the workpiece W may be kept out of physical interference with the fixed gun arm 12 and the movable gun arm 16.

To supply an electric current to the resistance welding gun 2, laminated copper sheet members 36a, 36b connected as a power cable to a power supply (not shown) are joined to the connector 15a of the conductive member 15 mounted on the bracket 8. The terminal end of the laminated copper sheet member 36a is electrically connected to the fixed gun arm 12 through the conductive member 15, whereas the terminal end of the laminated copper sheet member 36b is electrically connected to the movable gun arm 16 through an electrically conductive member 38 and a laminated copper sheet member 40.

When the resistance welding gun 2 is angularly moved into the position shown in FIG. 1, the laminated copper sheet members 36a, 36b secured to the resistance welding gun 2 are forcibly bent.

Modern automotive bodies are made of thin steel sheets which are treated for corrosion protection, e.g., galvanized. A welding current to be supplied for welding steel sheets of such automotive bodies is required to be large since it flows through the treated surfaces of the steel sheets. Power cables which carry such a welding current are large in cross section in order to increase their current capacity. The thick power cables are however difficult to flex freely, thus obstructing swinging movement of the resistance welding gun 2 out of interference with the workpiece W.

The poor flexibility of the power cable and slow movement of the resistance welding gun due to the large weight of the power cable are problematic not only during welding operation but also when retracting the welding gun from the workpiece for replacing the workpiece with a new one.

SUMMARY OF THE INVENTION

In view of the foregoing drawbacks of the conventional resistance welding gun, it is an object of the present invention to provide a method and an apparatus for supplying electric energy to a resistance welding gun so that the resistance welding gun can smoothly be moved in various patterns and a large welding current can be successfully supplied.

Another object of the present invention is to provide a method of supplying electric energy to a tiltable resistance welding gun having a pair of electrodes for gripping a workpiece and effecting resistance welding thereon, the method comprising the steps of connecting a power receiver terminal on the resistance welding gun and a power supply unit to each other when the electrodes grip the workpiece therebetween, supplying a welding current from the power supply unit to the power receiver terminal, and disconnecting the power receiver terminal and the power supply unit from each other when the electrodes are separated from the workpiece.

Still another object of the present invention is to provide an apparatus for supplying electric energy to a tiltable resistance welding gun having a pair of electrodes for gripping a workpiece and effecting resistance welding thereon, the apparatus comprising a power supply unit including a flexible electrically conductive member to be connected to a power supply, and connecting means connected to the power supply unit and drivable by an actuator so as to be connected to and disconnected from a power receiver terminal of the resistance welding gun.

Yet another object of the present invention is to provide the electric energy supplying apparatus wherein the power receiver terminal comprises a wedge-shaped terminal, and the connecting means comprises a tulip-type connector mechanism linearly movable by the actuator into and out of engagement with the wedge-shaped terminal.

Yet still another object of the present invention is to provide the electric energy supplying apparatus further including a member supporting the actuator and a damper spring supporting the member.

Another object of the present invention is to provide the electric energy supplying apparatus wherein the electrically conductive member comprises a pair of laminated copper sheet members, the laminated copper sheet members being curved in opposite directions.

It is also an object of the present invention to provide an apparatus for supplying electric energy to a tiltable resistance welding gun having a pair of electrodes for gripping a workpiece and effecting resistance welding thereon, the apparatus comprising a power receiver terminal fixed to the resistance welding gun and displaceable with tilting of the resistance welding gun, clamp means drivable by an actuator for gripping the power receiver terminal, and means for supplying an welding current from the clamp means to the power receiver terminal while the power receiver terminal is being clamped by the clamp means.

Another object of the present invention is to provide the electric energy supplying apparatus wherein the actuator comprises a cylinder, the clamp means comprising a fixed gripping member and a movable gripping member movable toward and away from the fixed gripping member by the cylinder, the fixed and movable gripping members having respective electrodes on inner surfaces thereof for gripping the power receiver terminal therebetween.

Still another object of the present invention is to provide an apparatus for supplying electric energy to a resistance welding gun, comprising a swing frame supporting the resistance welding gun thereon, a fixed frame on which the swing frame is swingably supported, a power supply terminal mounted on the fixed frame and connected to a power cable extending from a power supply, a power receiver terminal mounted on the swing frame and engageable with and disengageable from the power supply terminal, an electrically conductive member extending from the power receiver terminal to the resistance welding gun, and an actuator for angularly moving the swing frame through a predetermined angle.

A still further object of the present invention is to provide the electric energy supplying apparatus wherein the power supply terminal and the power receiver terminal are fixed to the fixed and movable frames, respectively, so that the power supply terminal and the power receiver terminal can be brought into and out of engagement with each other in response to swinging movement of the swing frame.

A yet further object of the present invention is to provide an apparatus for supplying electric energy to a resistance welding gun, comprising a swing frame supporting the resistance welding gun thereon, a fixed frame on which the swing frame is swingably supported, a first terminal mounted on the fixed frame and connected to a power cable extending from a power supply, a second terminal mounted on the swing frame and engageable with and disengageable from the first terminal, an electrically conductive member extending from the second terminal to the resistance welding gun, a first actuator for angularly moving the swing frame through a predetermined angle, and a second actuator for displacing and connecting the first terminal to the second terminal when the swing frame is angularly moved into a predetermined position by the first actuator.

A yet still further object of the present invention is to provide the electric energy supplying apparatus wherein the second actuator comprises a cylinder attached to a vertically displaceable attachment member movable on and along a guide rod, the attachment member being movable by a distance limited by a pin mounted on the guide rod.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 3:
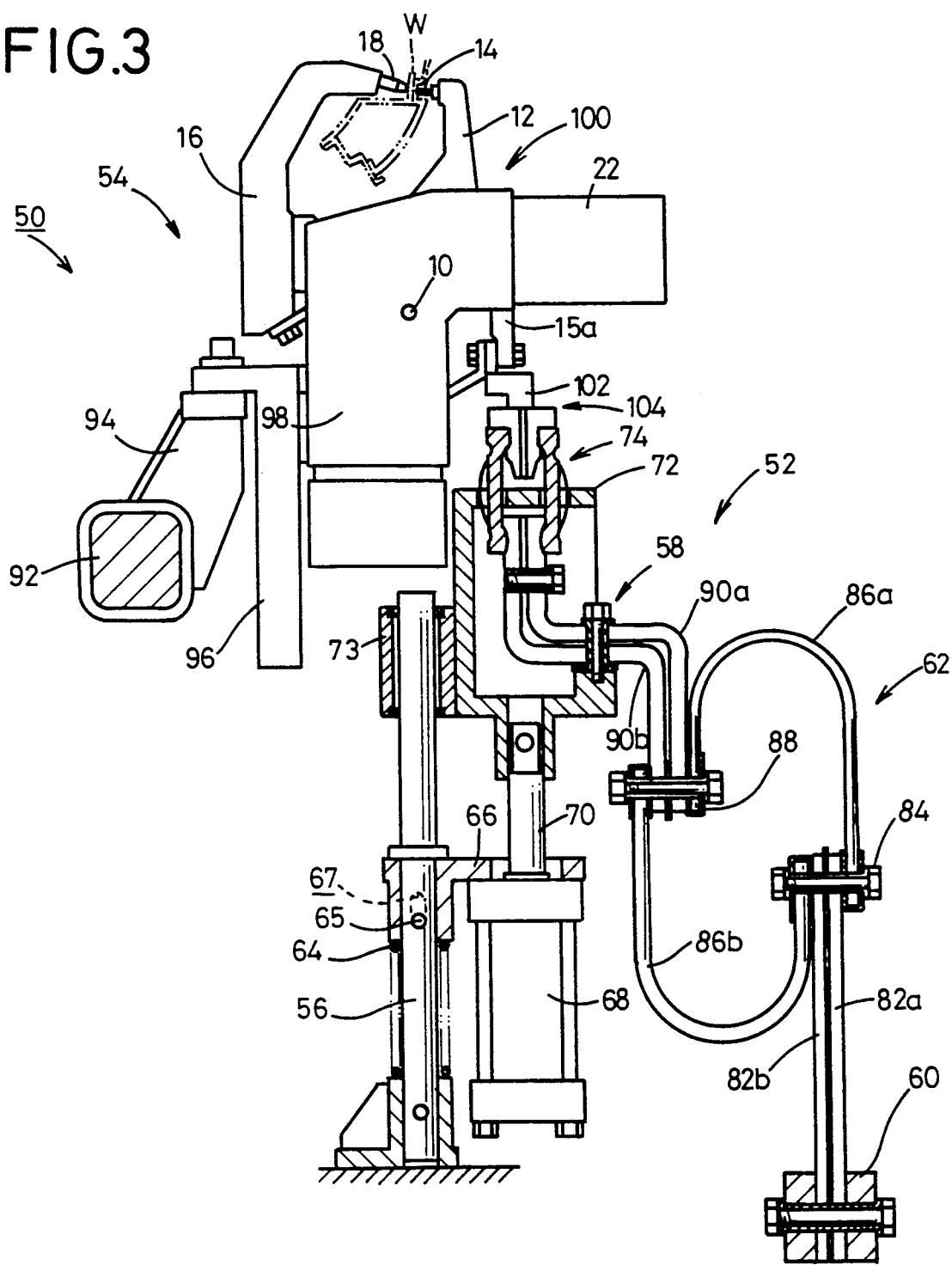
FIG. 3 is a side elevational view, partly in cross section, of an apparatus for supplying electric energy according to a first embodiment of the present invention.

FIG. 3 shows a welding system 50 including an electric energy supplying apparatus according to a first embodiment of the present invention, the apparatus being used in combination with a resistance welding gun.

The welding system 50 generally comprises an electric energy supplying apparatus 52 and a welding mechanism 54. The electric energy supplying apparatus 52 comprises a connecting means 58 for connecting and disconnecting a power receiver terminal of the welding mechanism 54 and a power supply terminal of the apparatus 52, the connecting means 58 being mounted on a guide bar 56 vertically installed on a floor, and a power supply unit 62 for connecting a secondary terminal 60 on a cable extending from a power supply (not shown) and the connecting means 58.

An attachment member 66 is mounted on the guide bar 56 and vertically movable therealong with a damper spring 64 between the attachment member 66 and a lower portion of the guide bar 56. The attachment member 66 has a vertically oblong hole 67 defined therein and receiving a pin 65 fixed to the guide bar 56. Therefore, the attachment member 66 is vertically movable by a distance equal to the vertical length of the hole 67. The attachment member 66 is normally biased toward its upper stroke limit by the damper spring 64. A cylinder 68 as a drive source for the connecting means 58 is fixed to and positioned beneath the attachment member 66, and has a piston rod 70 coupled to the lower end of a case 72 which has a power supply terminal 74. A guide sleeve 73 slidably fitted over the upper end of the guide bar 56 is fixed to a lateral side of the case 72 for guiding the case 72 as it is vertically moved by the cylinder 68.

Figure 4:
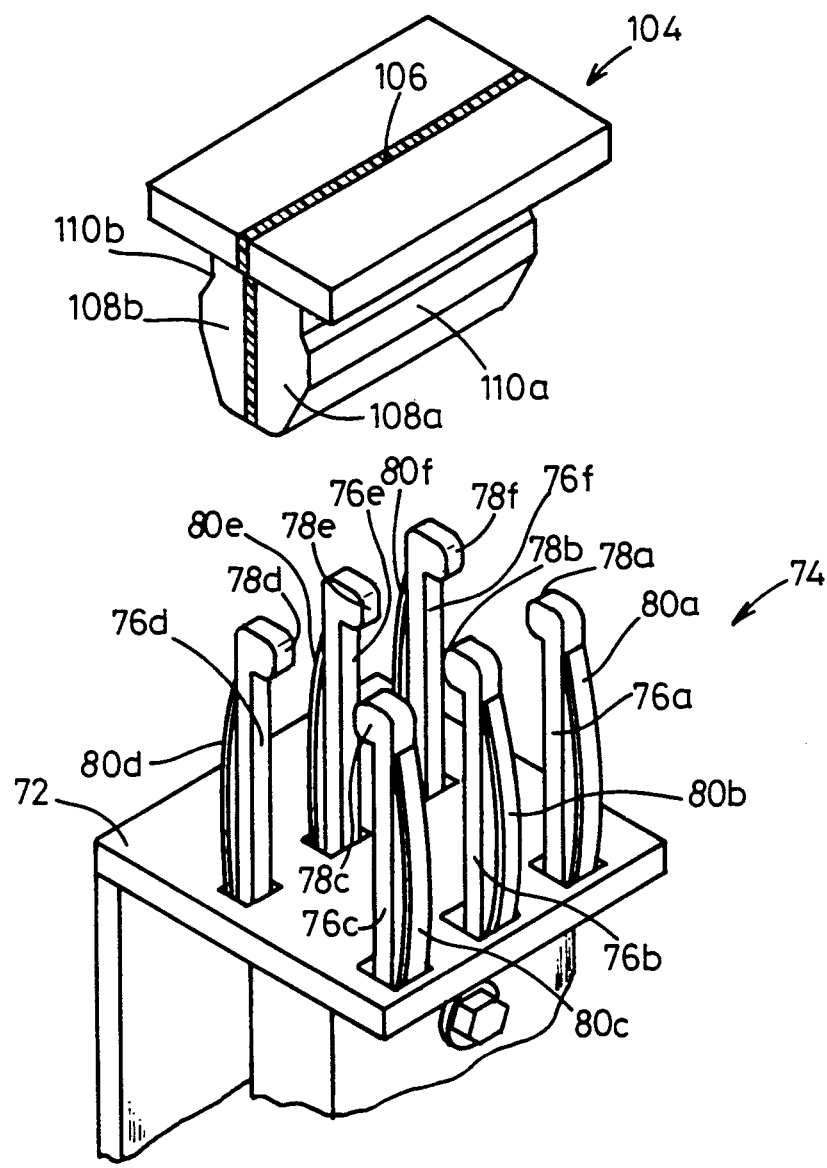
FIG. 4 is an enlarged exploded perspective view of a power supply terminal and a power receiver terminal of the apparatus shown in FIG. 3.

The power supply terminal 74 comprises a tulip-type connector mechanism including, as shown in FIG. 4, a plurality of electrically conductive segments 76a through 76f each made of a good conductor such as copper and having a hook on its upper distal end. The conductive segments 76a through 76f are arranged in two rows and extend through respective holes defined in the case 72. The conductive segments 76a through 76f have lower ends joined to a fixed electrically conductive member (described later). The hooked distal ends of the conductive segments 76a through 76f have engaging fingers 78a through 78f, respectively. Arcuate leaf springs 80a through 80f are attached to the surfaces of the conductive segments 76a through 76f, respectively, remotely from the engaging fingers 78a through 78f. The leaf springs 80a through 80f engage side walls of the holes in the case 72 for normally urging the conductive segments 76a through 76f inwardly to reduce the distance between the row of segments 76a through 76c and the row of segments 76d through 76f.

As shown in FIG. 3, the power supply unit 62 for supplying an electric current to the connecting means 58 comprises a pair of first electrically conductive plates 82a, 82b connected to the secondary terminal 60, a pair of flexible laminated copper sheet members 86a, 86b coupled to the first fixed conductor plates 82a, 82b through a connector 84, and a pair of second fixed electrically conductive plates 90a, 90b of a bent shape which connects the laminated copper sheet members 86a, 86b to the power supply terminal 74 through a connector 88. To allow the first fixed conductive plates 82a, 82b and the second fixed conductive plates 90a, 90b to be vertically displaced with respect to each other when the power supply terminal 74 is vertically moved with the case 72 by the cylinder 68, these first and second conductive plates 82a, 82b and 90a, 90b are connected by the flexible laminated copper sheet members 86a, 86b that are flexibly curved in opposite directions. The laminated copper sheet member 86a is curved in an upward convex configuration, whereas the laminated copper sheet member 86b is curved in a downward convex configuration.

Figure 1:
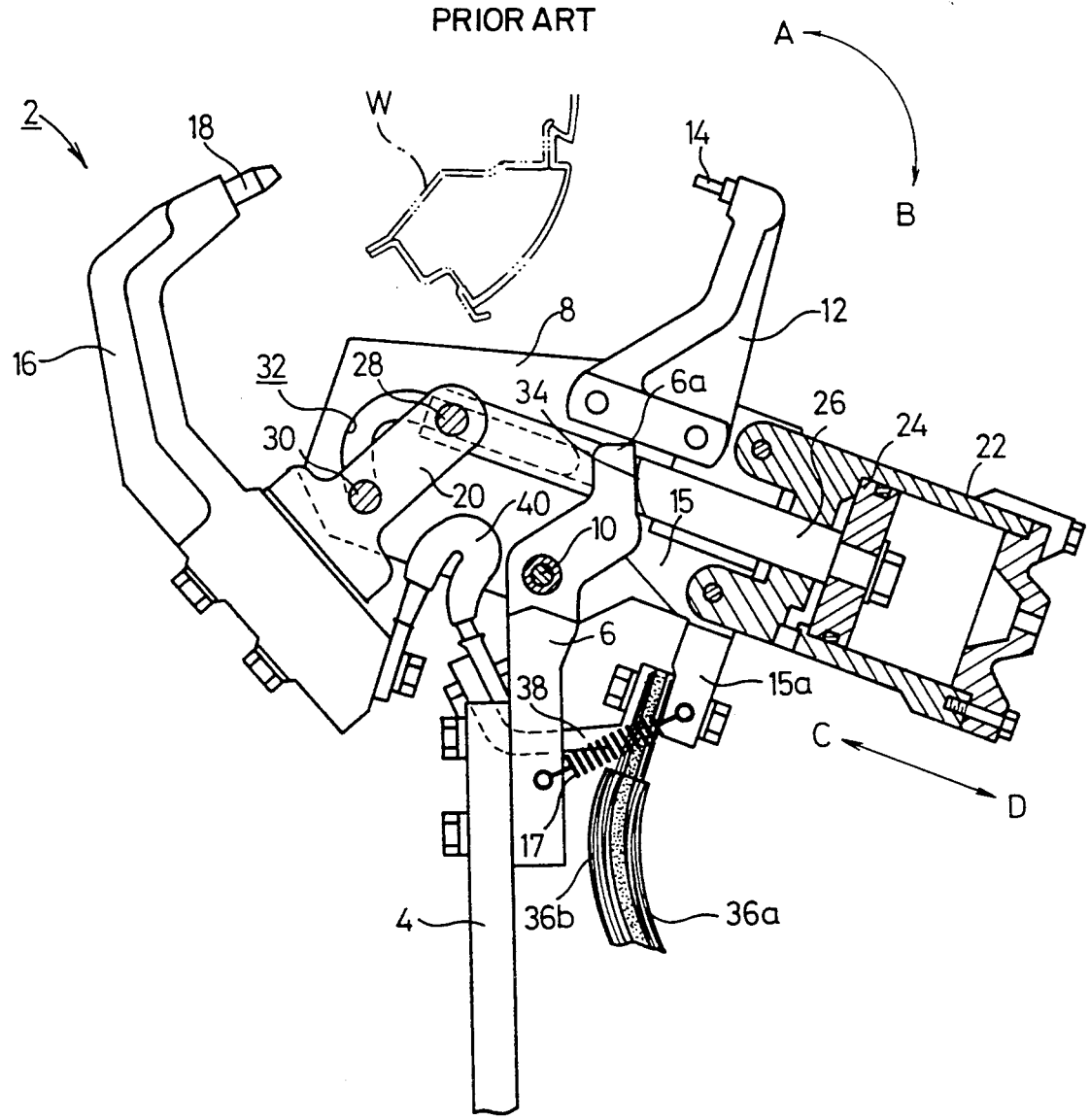
FIGS. 1 and 2 are side elevational view, partly in cross section, of a conventional resistance welding gun, showing the manner in which welding electric energy is supplied to the resistance welding gun.
Figure 2:
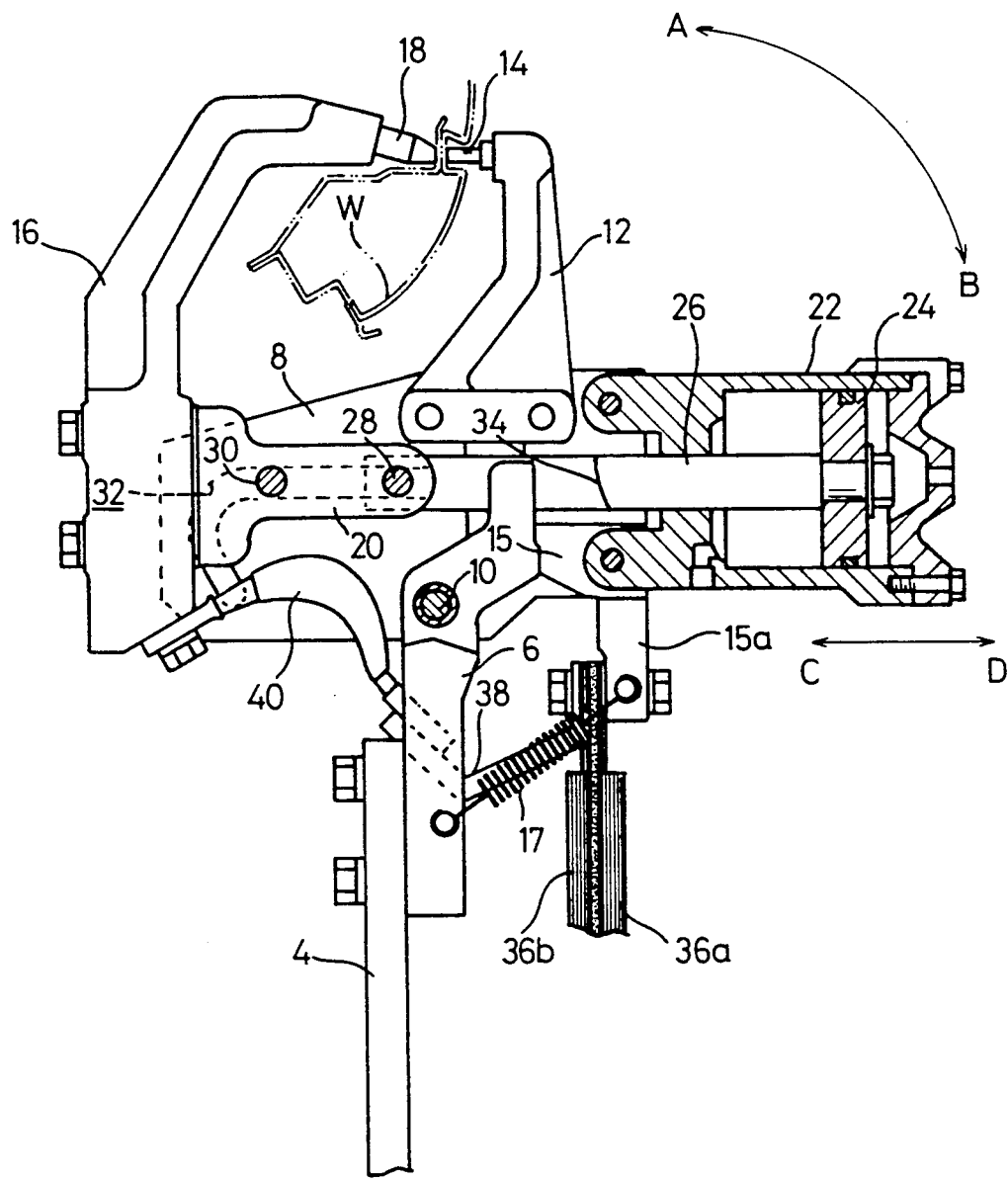

The welding mechanism 54 will be described below. An arm 94 is mounted on a beam 92 extending perpendicularly to the sheet of FIG. 3, and a resistance welding gun 100 is disposed in a housing 98 fixed to the arm 94 by a support 96. The resistance welding gun 100 is identical in structure to the resistance welding gun 2 shown in FIGS. 1 and 2, and its identical components are denoted by identical reference numerals and will not be described in detail.

The resistance welding gun 100 has a power receiver terminal 104 supported by a holder 102. As illustrated in FIG. 4, the power receiver terminal 104 is removably coupled to the power supply terminal 74 of the connecting means 58. The power receiver terminal 74 comprises a pair of wedge-shaped electrodes 108a, 108b joined to each other through an insulating plate 106 therebetween. The electrode 108a has a tapered step 110a engageable by the engaging fingers 78a through 78c of the conductive segments 76a through 76c. Likewise, the electrode 108b has a tapered step 110b engageable by the engaging fingers 78d through 78f of the conductive segments 76d through 76f. The electrode 108a is electrically connected to the fixed gun arm 12 through the holder 102, and the electrode 108b is electrically connected to the movable gun arm 16 through the holder 102.

The electric energy supplying apparatus according to the first embodiment is constructed as described above. Operation and advantages of the electric energy supplying apparatus will be described below in relation to a method of supplying electric energy according to the present invention.

Figure 5:
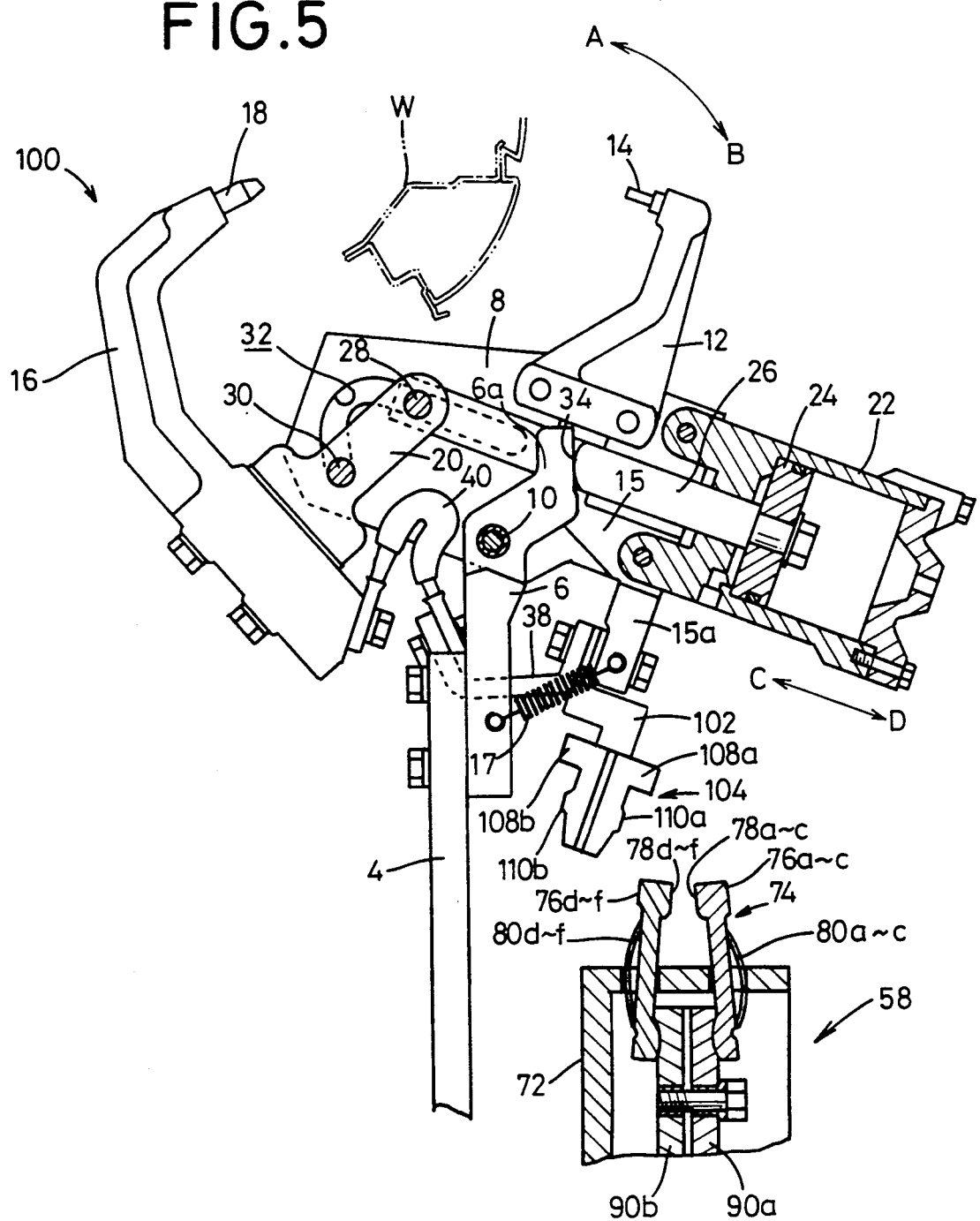
FIGS. 5 and 6 are side elevational views, partly in cross section, showing the manner in which a welding current is supplied from the apparatus of FIG. 3 to a resistance welding gun.

As shown in FIG. 5, the power supply terminal 74 of the connecting means 58 is not connected to the power receiver terminal 104 of the resistance welding gun 100 in an initial state. At this time, the piston rod 70 of the cylinder 68 is not extended to the position shown in FIG. 3.

The cylinder 22 of the resistance welding gun 100 is actuated to displace the piston 24 in the direction indicated by the arrow D, thus moving the cam 34 of the piston rod 26 away from the distal end 6a of the support arm 6. The bracket 8 is then angularly moved about the shaft 10 in the direction indicated by the arrow A under the resiliency of the compression spring 17. Therefore, the fixed gun arm 12 fixed to the bracket 8 is moved toward the workpiece W. Since the pins 28, 30 engage in the cam groove 32 of the bracket 8, the movable gun arm 16 operatively coupled to the piston rod 26 is moved toward the workpiece W as the piston 24 is displaced. Eventually, the workpiece W is gripped between the electrodes 14, 18 mounted on the distal ends of the fixed and movable gun arms 12, 16. During this time, the resistance welding gun 100 is moved in a smooth manner since the power receiver terminal 104 and the power supply terminal 74 are not connected to each other.

Figure 6:
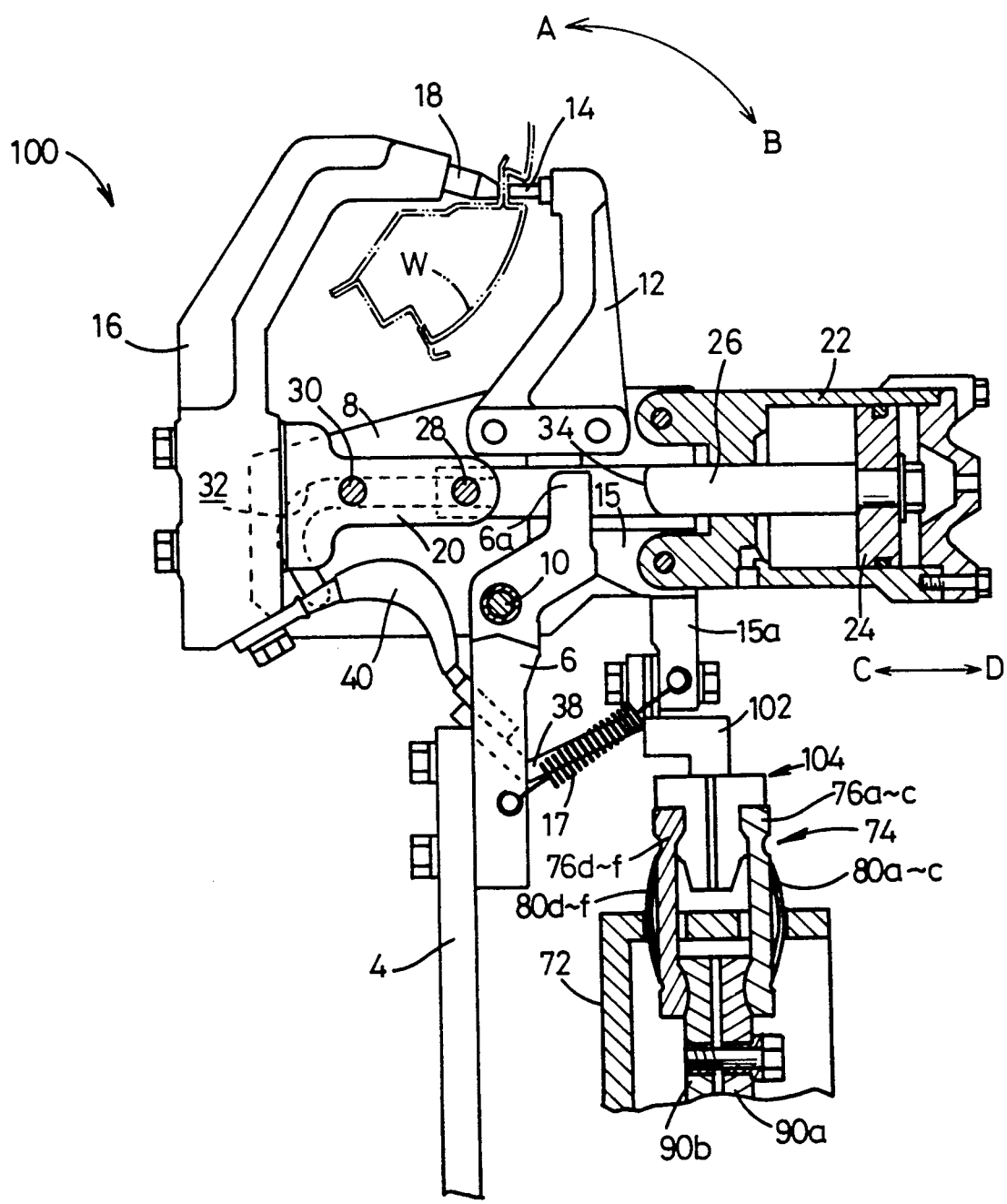

When the workpiece W is clamped by the fixed and movable gun arms 12, 16, the power receiver terminal 104 is positioned directly above the power supply terminal 74 as shown in FIG. 6. The power receiver terminal 104 of the resistance welding gun 100 and the power supply terminal 58 are then connected to each other, and an electric current is supplied from the power supply terminal 58 to the power receiver terminal 104. More specifically, the piston rod 70 of the cylinder 68 is displaced upwardly to move the power supply terminal 74 on the case 72 toward the power receiver terminal 104. The lower distal end of the power receiver terminal 104 is inserted between the row of conductive segments 76a through 76c and the row of conductive segments 76d through 76f of the power supply terminal 74. Then, the engaging fingers 78a through 78f of the conductive segments 76a through 76f engage the steps 110a, 110b of the electrodes 108a, 108b of the power receiver terminal 104, whereupon the power supply terminal 74 and the power receiver terminal 104 are connected to each other.

Shocks produced when the power supply terminal 74 engages the power receiver terminal 104 are absorbed by the damper spring 64 which resiliently supports the attachment member 66 on which the cylinder 68 is mounted. Since the flexible laminated copper sheet members 86a, 86b are included in the power supply unit 62 which connects the power supply to the power supply terminal 74, the case 72 can smoothly be displaced by the cylinder 68.

A welding current is then supplied from the power supply terminal 74 and flows through the workpiece W gripped between the electrodes 14, 18 of the fixed and movable gun arms 12, 16. The workpiece members are now welded to each other by the Joule heat.

After the workpiece W has been welded, the power receiver terminal 104 is disconnected from the power supply unit 62. More specifically, the cylinder 68 of the connecting means 58 is operated to lower the piston rod 70. The power supply terminal 104 is forcibly moved downwardly out of engagement with the power receiver terminal 74.

The resistance welding gun 100 can subsequently be moved smoothly. Thereafter, the piston 24 of the cylinder 22 is displaced in the direction indicated by the arrow C to displace the movable gun arm 16 away from the fixed gun arm 12. As the cam surface 34 of the piston rod 26 starts to engage the distal end 6a of the support arm 6, the cylinder 22 applies a force tending to turn the bracket 8 as a whole in the direction indicated by the arrow B against the bias of the compression spring 17. The fixed gun arm 12 is displaced away from the workpiece W, which is now put out of physical interference with the resistance welding gun 100 (see FIG. 5).

Because the power supply terminal 74 and the power receiver terminal 104 have been disconnected from each other, the swinging movement of the resistance welding gun 100 is not obstructed. The workpiece W is then moved horizontally by a conveyor means (not shown) to position a ne welding spot on the workpiece between the fixed and movable gun arms 12, 16. At this time, the workpiece W does not physically interfere with the fixed and movable gun arms 12, 16. The workpiece W can then be welded at the new welding spot without fail.

Figure 7:
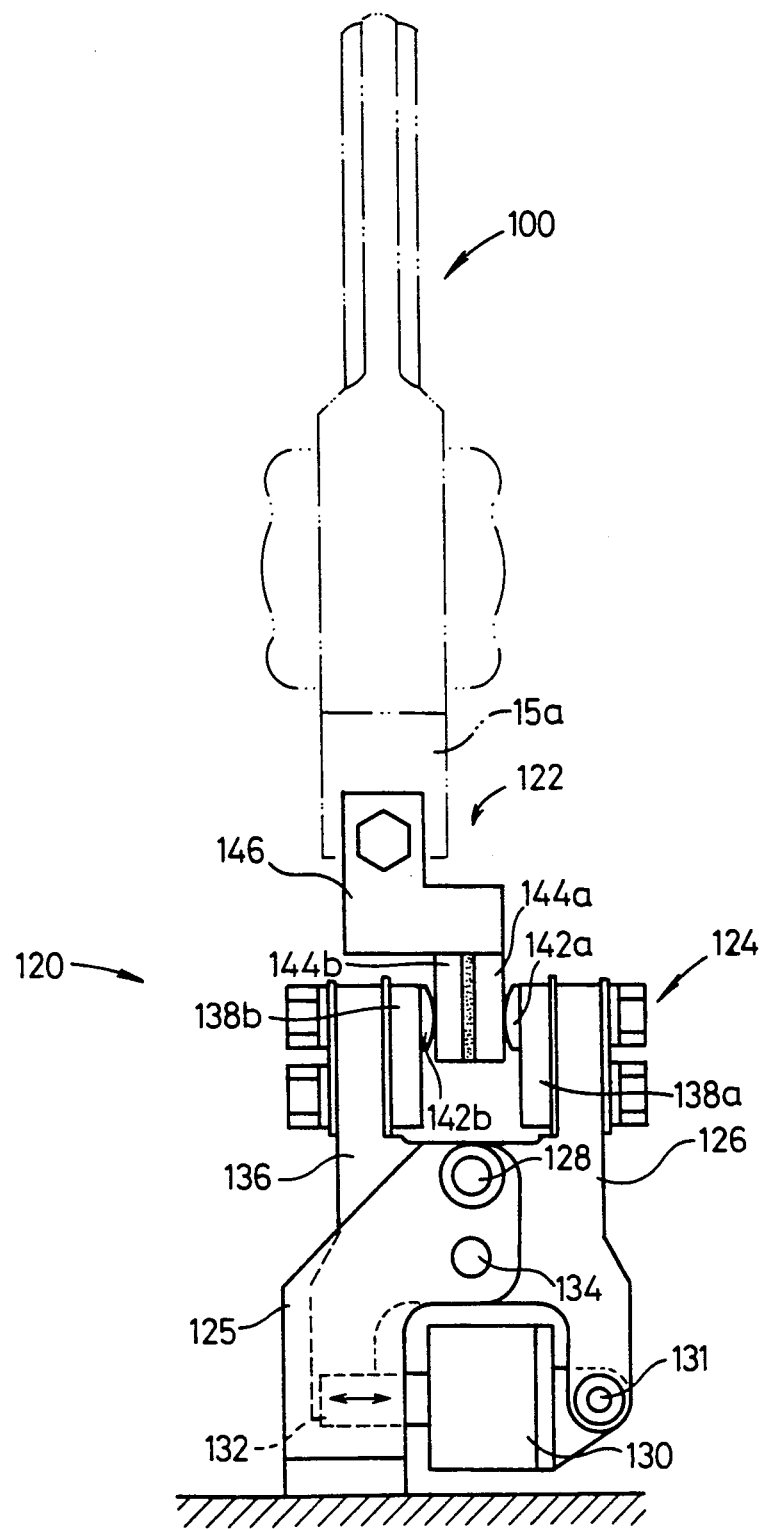
FIG. 7 is a side elevational view of an apparatus for supplying electric energy according to a second embodiment of the present invention.
Figure 8:
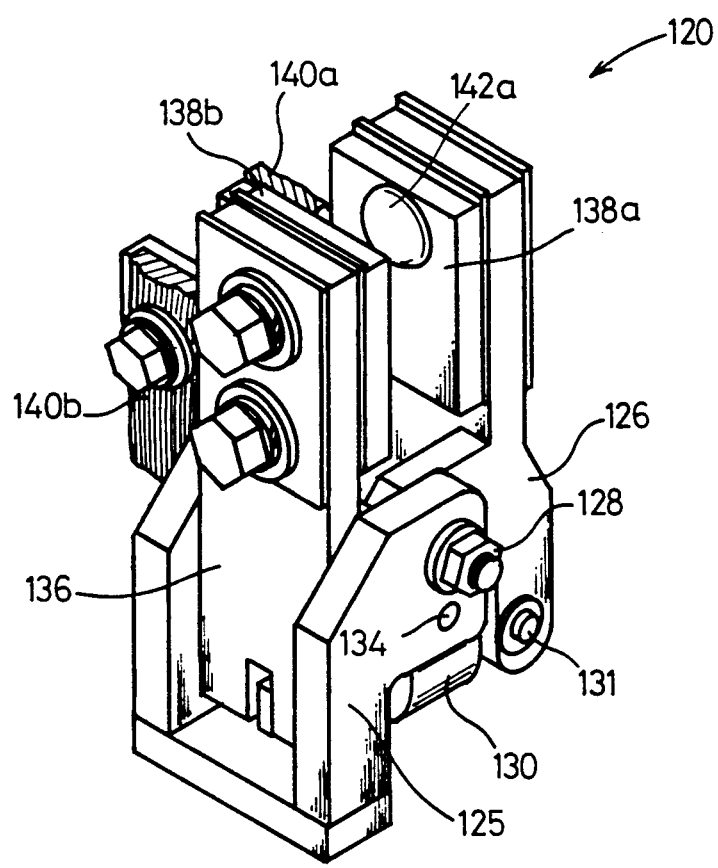
FIG. 8 is a perspective view of the apparatus shown in FIG. 7.

FIGS. 7 and 8 show an electric energy supplying apparatus according to a second embodiment of the present invention. The electric energy supplying apparatus shown in FIGS. 7 and 8 is used in combination with a resistance welding gun which is identical to the resistance welding gun 100 shown in FIGS. 3, 5, and 6.

The electric energy supplying apparatus, generally denoted at 120, is basically constructed of a power receiver unit 122 on the resistance welding gun 100 and a clamp means 124 for gripping the power receiver unit 122 to allow an electric current to be supplied from a power supply to the power receiver unit 122.

The clamp mean 124 will first be described below. A fixed gripping member 126 is fastened to a bracket 125 by means of a bolt 128. A cylinder 130 has an end coupled by a hinge pin 131 to the lower end of the fixed gripping member 126. The cylinder 130 has a piston rod 132 coupled to the lower end of a movable gripping member 136 which is swingably supported on the bracket 125 by means of a pin 134. Electrodes 138a, 138b are fixed respectively to confronting inner surfaces of the fixed and movable gripping members 126, 136. The electrodes 138a, 138b have outwardly extending ends to which there are connected ends of laminated copper sheet members 140a, 140b (FIG. 8), respectively, with their opposite ends connected to the secondary terminal of a welding transformer or the like. The electrodes 138a, 138b have hemispherical projections 142a, 142b on their confronting surfaces to provide good electric connection with the power receiver unit 122.

The power receiver unit 122 has two electrically conductive members 144a, 144b as a power receiver terminal connected to the connector 15a of the conductive member 15. The conductive members 144a, 144b with an insulating member interposed therebetween are fixed to a holder 146 coupled to the connector 15a. The conductive plate 144a is electrically connected to the fixed gun arm 12 through the conductive member 15, whereas the conductive plate 144b is electrically connected to the movable gun arm 16 through the conductive member 38 and the laminated copper sheet member 40 (see FIGS. 1, 2, 5, and 6).

Figure 9:
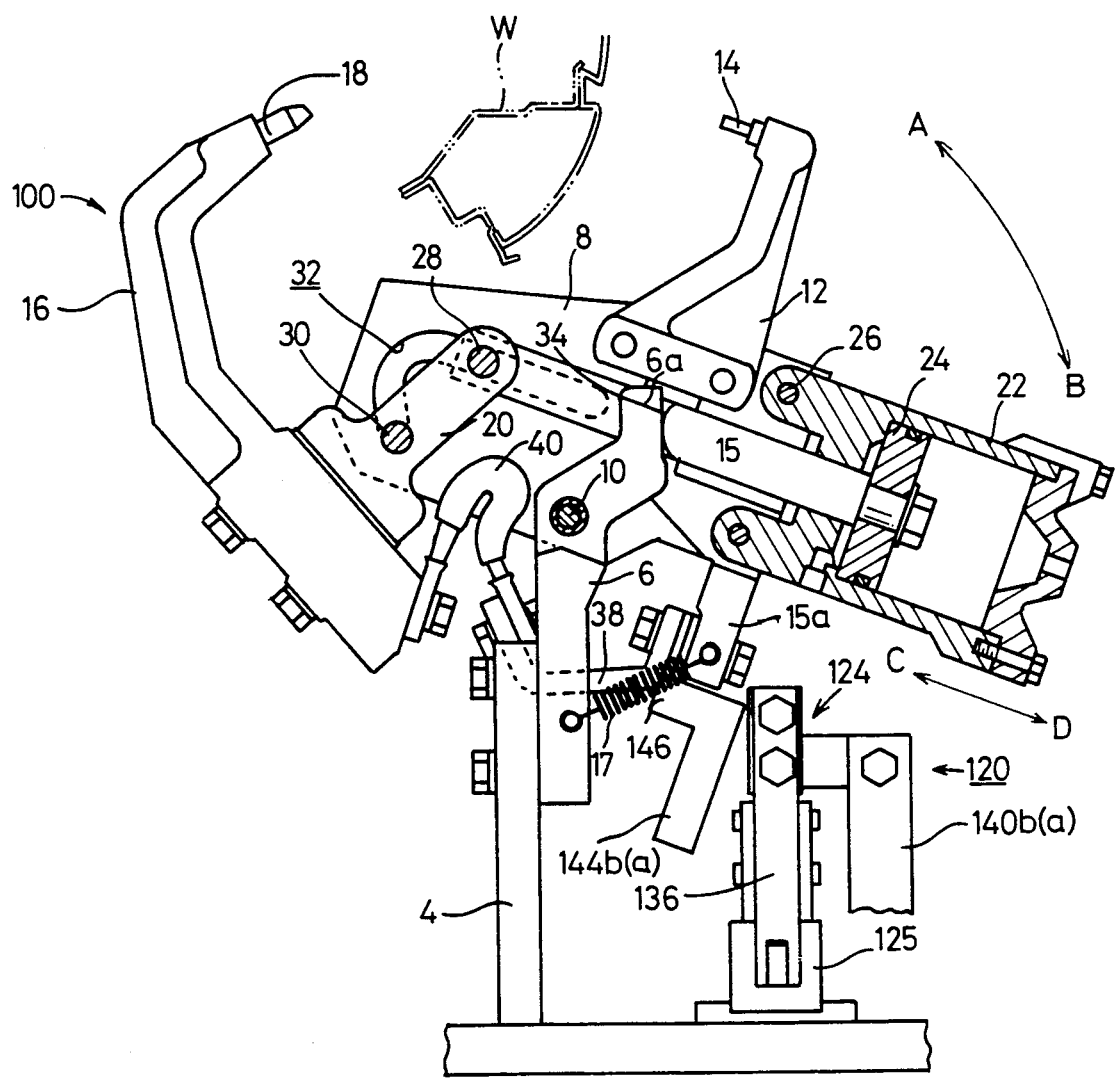
FIGS. 9 and 10 are side elevational views, partly in cross section, showing the manner in which a welding current is supplied from the apparatus of FIG. 7 to a resistance welding gun.

The electric energy supplying apparatus according to the second embodiment operates as follows:

As shown in FIG. 9, before a spot welding operation is started, the conductive plates 144a, 144b as the power receiver terminal of the resistance welding gun 100 are spaced from the power supply unit 120.

The cylinder 22 is actuated to displace the piston 24 in the direction indicated by the arrow D, thus moving the cam 34 of the piston rod 26 away from the distal end 6a of the support arm 6. The bracket 8 is then angularly moved about the shaft 10 in the direction indicated by the arrow A under the resiliency of the compression spring 17. Therefore, the fixed gun arm 12 is moved toward the workpiece W. Since the pins 28, 30 move along the cam groove 32 of the bracket 8, the movable gun arm 16 is moved toward the workpiece W as the piston 24 is displaced. Finally, the workpiece W is gripped between the electrodes 14, 18 mounted on the distal ends of the fixed and movable gun arms 12, 16. At this time, as shown in FIG. 7, the conductive plates 144a, 144b are positioned between the electrodes 138a, 138b of the fixed and movable gripping members 126, 136 of the power supply unit 120. Then, the power receiver terminal or the conductive plates 144a, 144b and the power supply unit 120 are connected to each other.

Figure 10:
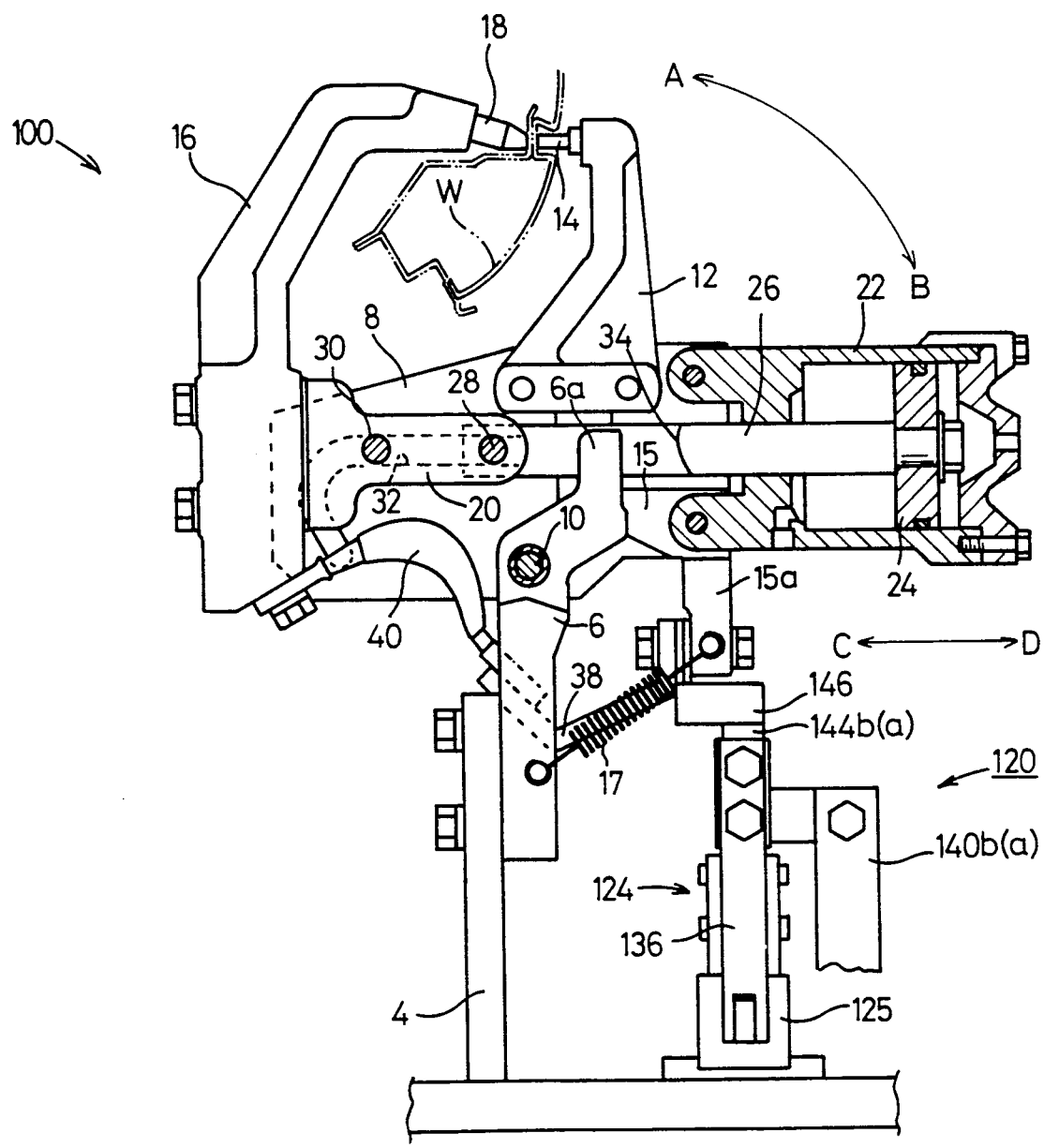

More specifically, the cylinder 130 is operated to project the piston rod 132 thereof to the left (FIG. 7). The movable gripping member 136 coupled to the piston rod 132 is turned about the pin 134 toward the fixed gripping member 126, thereby enabling the electrodes 138a, 138b to grip the conductive plates 144a, 144b therebetween. With the conductive pates 144a, 144b thus clamped between the electrodes 138a, 138b, an electric current is supplied from the welding transformer through the laminated copper sheet members 140a, 140b connected to the respective electrodes 138a, 138b. The current then flows through the workpiece W gripped between the electrodes 14, 18 on the fixed and movable gun arms 12, 16, and produces Joule heat to weld the workpiece members as shown in FIG. 10.

After the workpiece W has been welded, the power receiver terminal and the power supply unit 120 are disconnected from each other to discontinue the supply of the electric current. At this time, the piston rod 132 of the cylinder 130 is retracted to turn the movable gripping member 136 away from the fixed gripping member 126, thus unclamping the conductive plates 144a, 144b.

The piston 24 is displaced in the direction indicated by the arrow C to bring the cam surface 34 into engagement with the distal end 6a of the support arm 6. The movable gun arm 16 is angularly spaced from the workpiece W, and the bracket 8 is caused by the cam surface 34 to turn as a whole in the direction indicated by the arrow B, so that the fixed gun arm 12 is displaced away from the workpiece W. Since the conductive plates 144a, 144b have been released at this time, the turning movement of the resistance welding gun 100 is not obstructed. The resistance welding gun 100 does not interfere with the workpiece W. Accordingly, the workpiece W can be successfully spot-welded at a next spot.

An electric energy supplying apparatus according to a third embodiment of the present invention will be described below with reference to FIGS. 11 through 14. This electric energy supplying apparatus allows a welding gun to be retracted from a welding position without being obstructed by a power cable.

Figure 11:
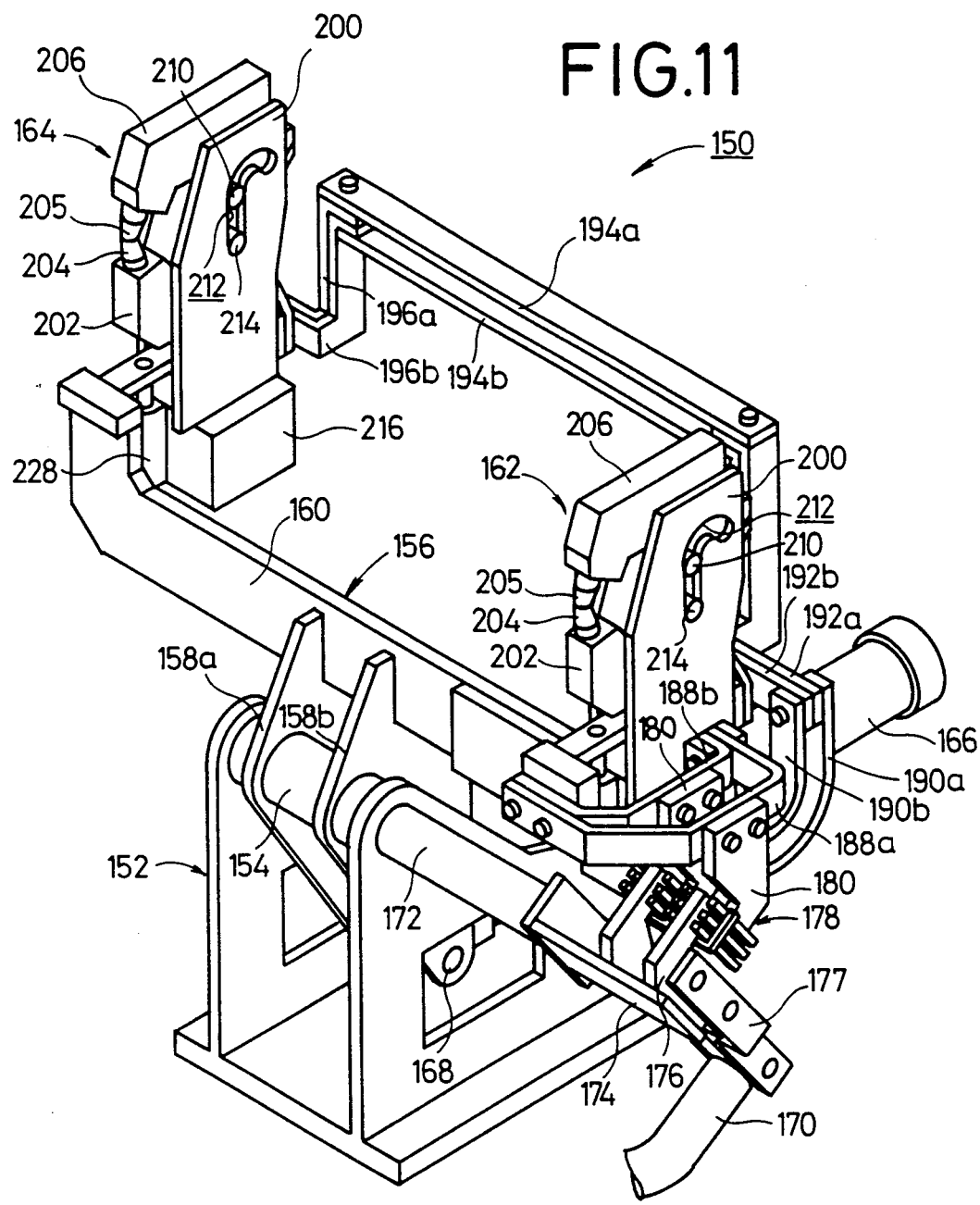
FIG. 11 is a perspective view of an apparatus for supplying electric energy according to a third embodiment of the present invention.

As shown in FIG. 11, the electric power supplying apparatus, generally designated at 150, has a fixed frame 152 securely mounted on a base (not shown) and a swing frame 156 angularly movably mounted on the fixed frame 152 by a shaft 154 and supporting two welding guns. The swing frame 156 comprises a pair of swing support plates 158a, 158b fixed to the shaft 154, and an arm 160 fixed to the upper ends of the swing support plates 158a, 158b. A pair of resistance welding guns 162, 164 is mounted respectively on the opposite ends of the arm 160. The resistance welding guns 162, 164 will be described later on.

Figure 12:
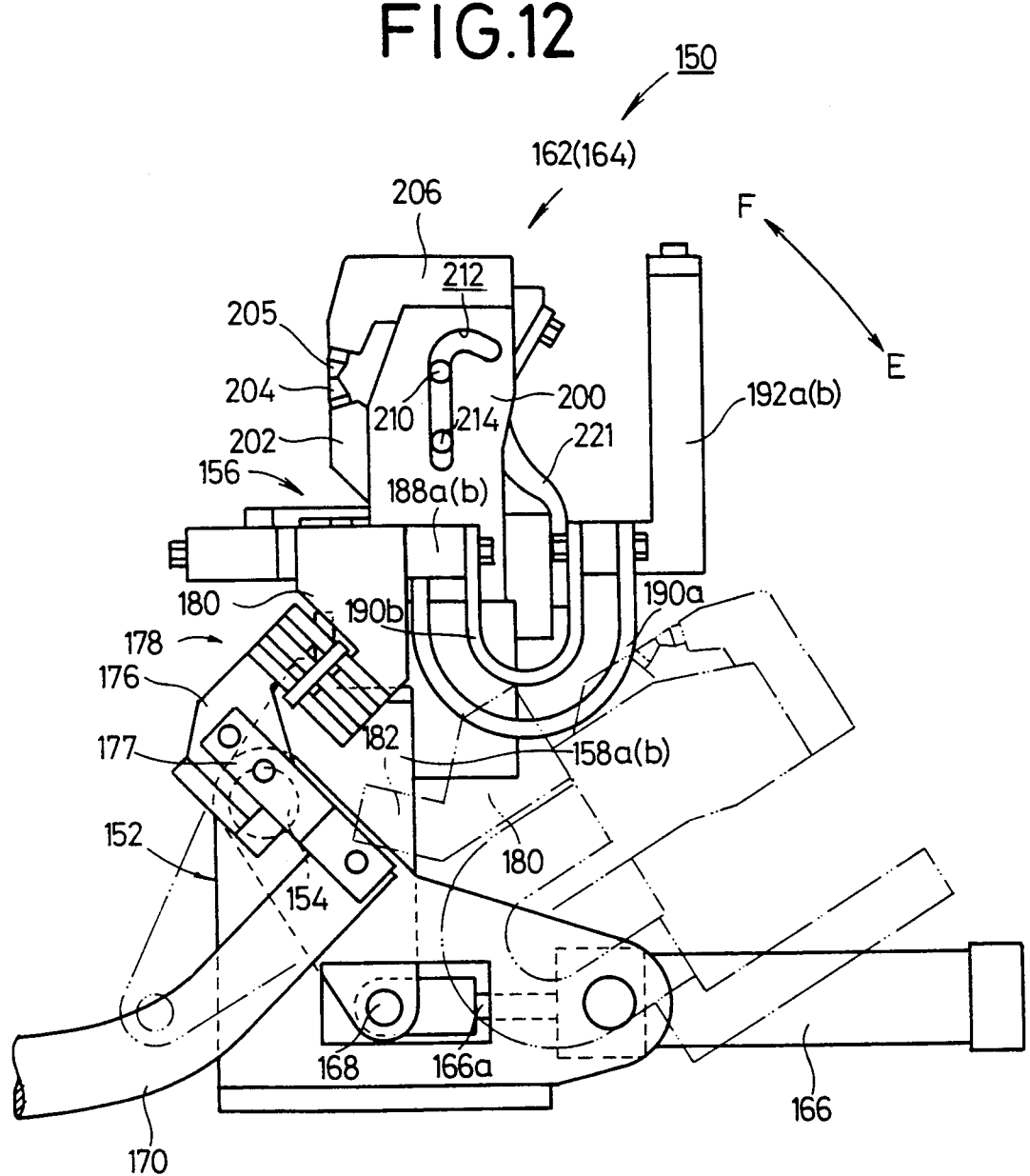
FIG. 12 is a side elevational view of the apparatus shown in FIG. 11.

As illustrated in FIG. 12, the electric energy supplying apparatus 150 also has an actuator 166 comprising a swing cylinder 166 for turning the swing frame 156 through a predetermined angle. The swing cylinder 166 has a piston rod 166a with its distal end connected by a pin 168 to the lower ends of the swing support plates 158a, 158b.

A power supply path for supplying a welding current to the resistance welding guns 162, 164 is constructed as follows: A power cable 170 extending from a power supply (not shown) is connected by a connector 177 to a pair of first terminals 176 mounted on a bracket 174 on the distal end of a support member 172 fixed to and extending horizontally from a side of the fixed frame 152. A pair of power supply terminals 178 is attached respectively to the first terminals 176. A pair of power receiver terminals 182 engageable with and disengageable from the power supply terminals 178 is attached respectively to second terminals 180 of the swing frame 156.

Figure 13:
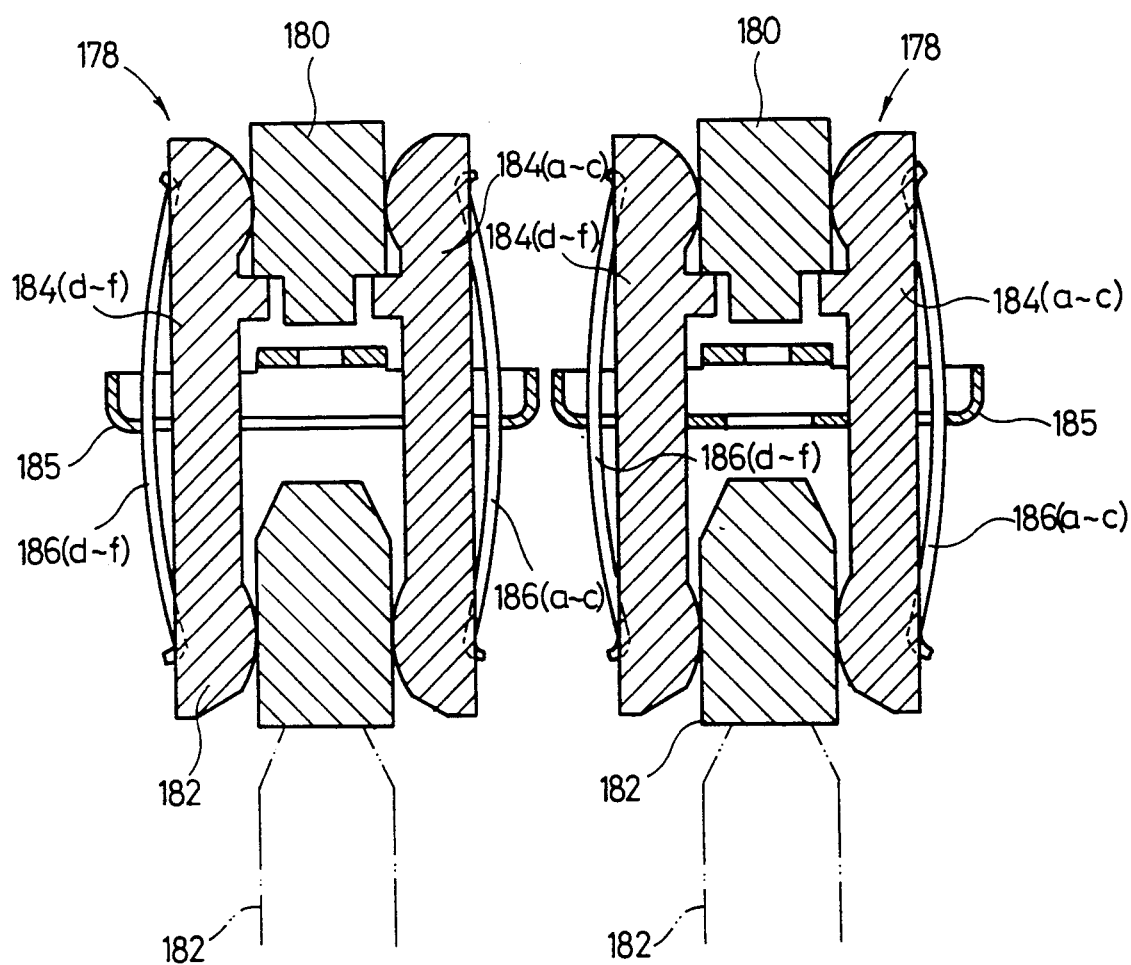
FIG. 13 is an enlarged cross-sectional view of contact terminals of the apparatus of FIG. 11.

The power supply terminals 178 and the power receiver terminals 182 are shown in detail in FIG. 13. Each of the power supply terminals 178 comprises a tulip-type connector mechanism similar to the power supply terminal 74 shown in FIG. 3. The power supply terminal 178 includes two rows of electrically conductive segments 184a through 184f each made of a good conductor such as copper and having a hook on its upper distal end. Arcuate leaf springs 186a through 186f are attached to the rear surfaces of the conductive segments 184a through 184f, respectively, and held in position by a handle 185 for for normally urging the conductive segments 184a through 184f inwardly to reduce the distance between the row of segments 184a through 184c and the row of segments 184d through 184f. Each of the power receiver terminals 182 is of a wedge shape. When each power receiver terminal 182 is inserted between the two rows of conductive segments 184a through 184f, the power receiver terminal 182 is gripped and connected to the power supply terminal 178.

The swing frame 156 has electrically conductive members for supplying electric currents from the power receiver terminal 182 to the resistance welding guns 162, 164. More specifically, the second terminals 180 are connected respectively to a pair of first electrically conductive plates 188a, 188b connected to ends of a pair of flexible laminated copper sheet members 190a, 190b, respectively. The other ends of the laminated copper sheet members 190a, 190b are joined to ends of a pair of second electrically conductive plates 192a, 192b with an insulating member interposed therebetween. The other ends of the conductive plates 192a, 192b are connected to a pair of third electrically conductive plates 196a, 196b, respectively, through a pair of laminated copper sheet members 194a, 194b. The resistance welding gun 162 is electrically connected to the second conductive plates 192a, 192b, whereas the resistance welding gun 164 is electrically connected to the third conductive plates 196a, 196b.

Figure 14:
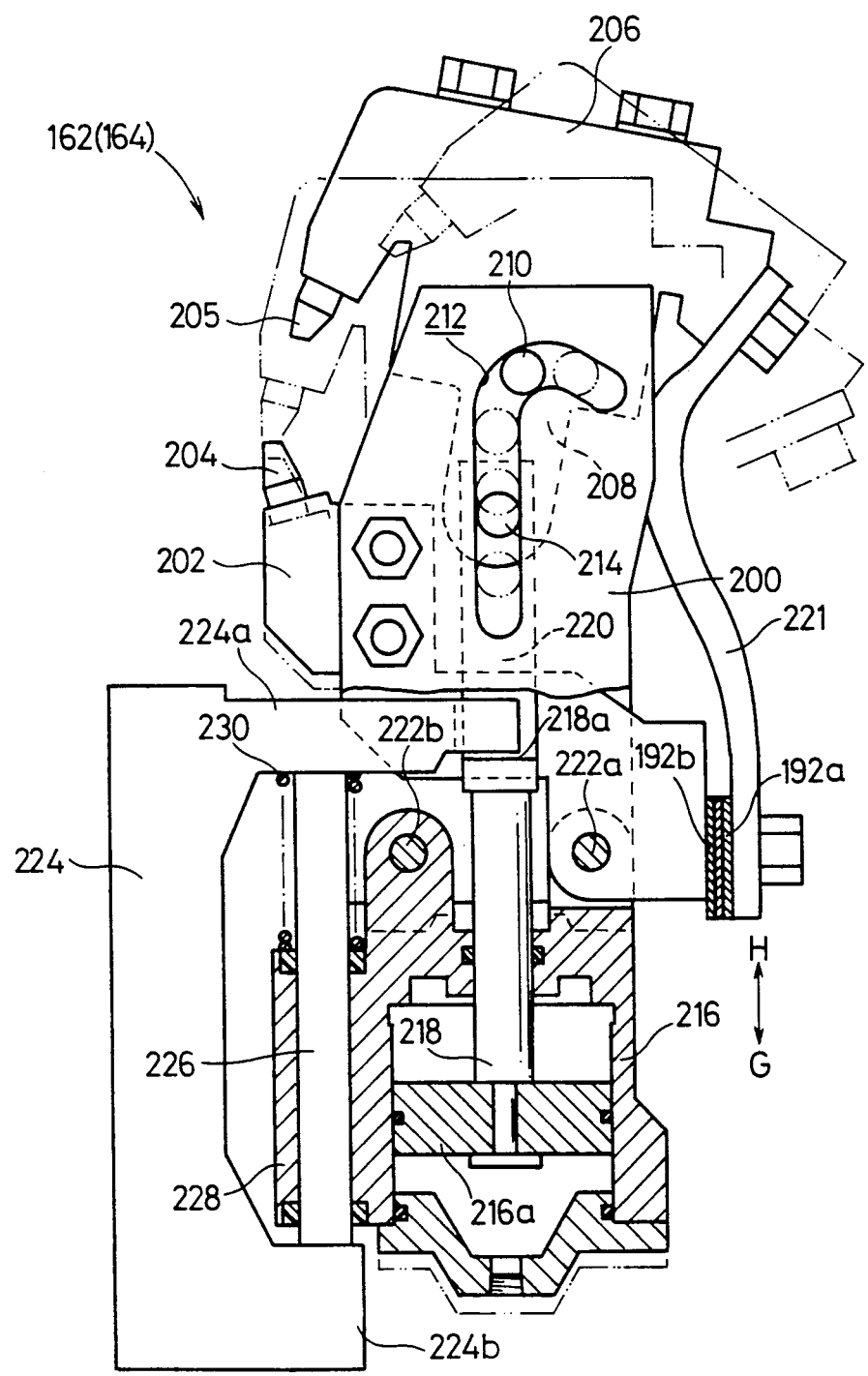
FIG. 14 is a side elevational view, partly in cross section, of a resistance welding gun for use in combination with the apparatus shown in FIG. 11.

The resistance welding guns 162, 164 are constructed as shown in FIG. 14. The resistance welding guns 162, 164 are structurally identical to each other.

More specifically, a fixed gun arm 202 is attached to a bracket 200, and an electrode 204 is mounted on the distal end of the fixed gun arm 202. A movable gun arm 206 operable in coaction with the fixed gun arm 202 has an electrode 205 on its distal end. A pin 210 is mounted on a lever 208 on the tail end of the movable gun arm 206, and rides in a J-shaped cam groove 212 defined in the bracket 200. The lever 208 is connected by a pin 214 to a connector 220 extending from a piston rod 218 of a cylinder 216 which moves the movable gun arm 206 toward and away from the fixed gun arm 202. The second conductive plate 192a and the movable gun arm 206 are connected to each other by a flexible laminated copper sheet member 221.

The cylinder 216 is attached to the lower end of the bracket 200 by means of pins 222a, 222b. The cylinder 216 has a slider 228 slidably fitted over a guide rod 226 extending between upper and lower frames 224a, 224b of a support 224. Between the slider 228 and the upper frame 224a of the support 224, there is disposed a coil spring 230 for normally urging the resistance welding gun 162 downwardly as a whole.

The resistance welding gun 162 operates as follows: When a piston 216a of the cylinder 216 is displaced in the direction indicated by the arrow G, the movable gun arm 206 is turned toward the fixed gun arm 202 while the pins 210, 214 are being guided in and along the cam groove 212.

When the piston 216a is moved in the direction indicated by the arrow H, a step 218a on the end of a piston rod 218 of the cylinder 216 abuts against the upper frame 224a of the support 224 on the upward stroke of the piston rod 218. As the piston 216a is displaced to the stroke end, the resistance welding gun 162 is bodily displaced downwardly, and the movable gun arm 206 is turned away from the fixed gun arm 202.

Operation and advantages of the electric energy supplying apparatus according to the third embodiment will be described below.

As shown in FIGS. 11 and 13, during welding operation, the power supply terminal 178 on the fixed frame 152 and the power receiver terminal 182 on the swing frame 156 are connected to each other in order to supply a welding current to the resistance welding guns 162, 164. In each of the resistance welding guns 162, 164, a prescribed voltage is applied between the electrode 204 of the fixed gun arm 202 and the electrode 205 of the movable gun arm 206. With a workpiece sandwiched between the electrodes 204, 205, a welding current flows through the workpiece and welds workpiece members with Joule heat.

After the workpiece has been welded at all welding spots, the workpiece is replaced with another workpiece. For such workpiece replacement, the resistance welding guns 162, 164 are retracted from the welding position. At this time, the electric energy supplying apparatus 150 operates as follows:

As illustrated in FIG. 12, the piston rod 166a of the swing cylinder 166 is projected to turn the swing frame 156 about the shaft 154 in the direction indicated by the arrow E. The power receiver terminal 182 on the swing frame 156 is thus separated from the power supply terminal 178 on the fixed frame 152. The resistance welding guns 162, 164 supported on the swing frame 156 is now retracted to a retracted position indicated by the two-dot-and-dash lines in FIG. 12.

After the workpiece has been replaced with another workpiece, the resistance welding guns 162, 164 are moved back to the welding position by reversing the above process. That is, the piston rod 166a is retracted to turn the swing frame 156 in the direction indicated by the arrow F during which time the power receiver terminal 182 is inserted into the power supply terminal 178.

The resistance welding guns 162, 164 can be smoothly shifted from and into the welding position without being obstructed by the power cable 170.

In the third embodiment, the power supply and receiver terminals are connected to and disconnected from each other while the swing frame 156 is being turned. A modification of the third embodiment will be described below with reference to FIG. 15. Those parts in FIG. 15 which are identical to those of the third embodiment are denoted by identical reference numerals, and will not be described in detail.

Figure 15:
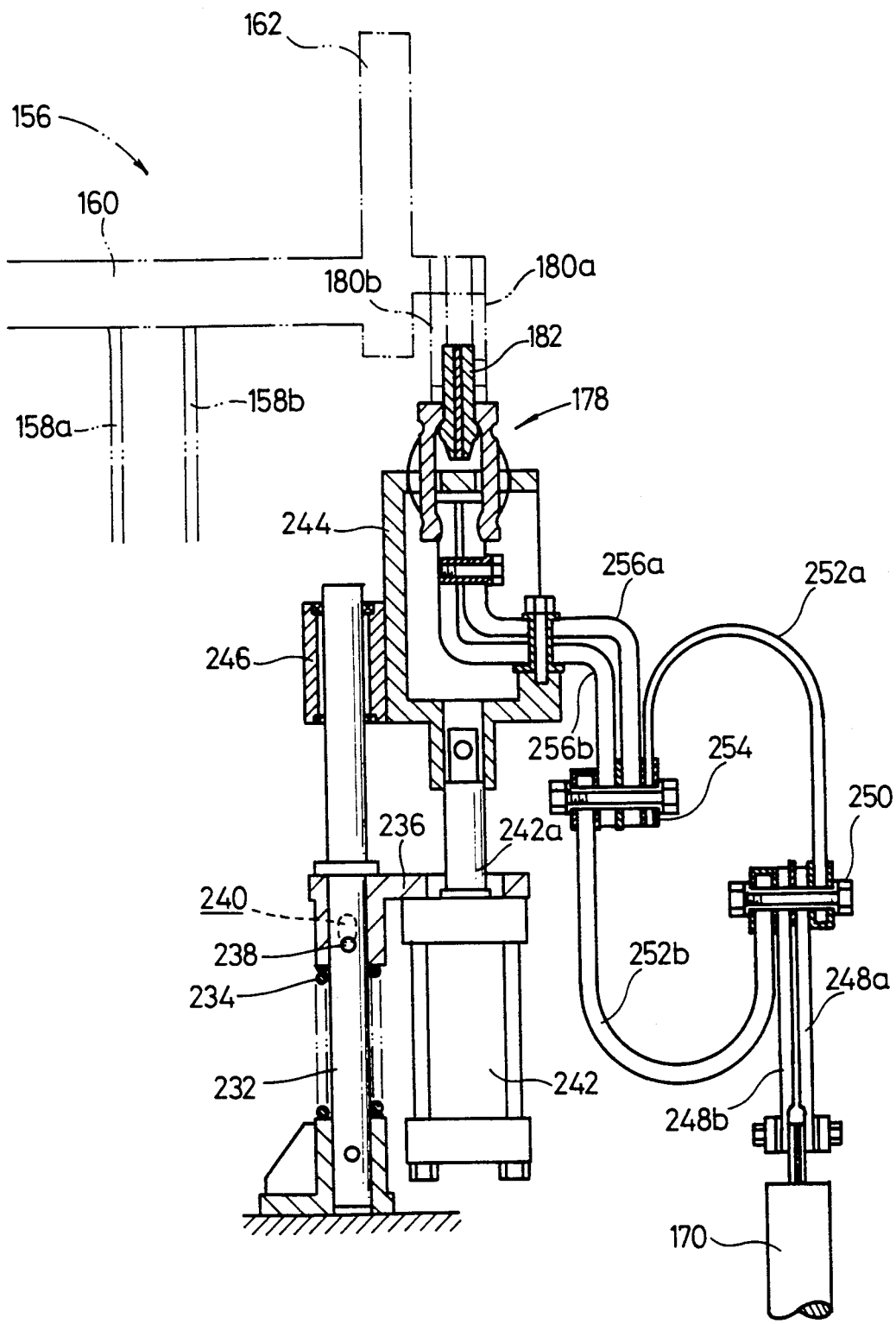
FIG. 15 is a cross-sectional view of a modified mechanism for connecting and disconnecting contact terminals.

In the modification shown in FIG. 15, a power supply terminal 178 on a fixed frame 152 is vertically movable by a cylinder toward and away from a power receiver terminal 182 on a swing frame 156. The modified arrangement of FIG. 15 is essentially identical to the electric energy supplying apparatus 52 shown in FIG. 3. More specifically, an attachment member 236 is vertically movably supported on a guide rod 232 with a damper spring 234 acting therebetween. The attachment member 236 is vertically movable a distance equal to the length of an oblong hole 240 defined in the attachment member 236 and receiving a pin 238 fixed to the guide rod 232. A cylinder 242 is fixed to the attachment member 236 and has a piston rod 242a coupled to the lower end of a case 244 on which the power supply terminal 178 is supported. A guide sleeve 246 slidably fitted over the upper end of the guide rod 232 is fixed to a side of the case 244.

The power supply terminal 178 is connected to the power cable 170 as follows: The power cable 170 is connected to a pair of first fixed electrically conductive plates 248a, 248b which are coupled to ends of a pair of flexible laminated copper sheet members 252a, 252b through a connector 250. The other ends of the laminated copper sheet members 252a, 252b are in turn connected through a connector 254 to a pair of second fixed electrically conductive plates 256a, 256b that are joined to the power supply terminal 178.

During welding operation, the piston rod 242a of the cylinder 242 is projected to connect the power supply terminal 178 to the power receiver terminal 182. When the resistance welding guns 162, 164 are to be retracted from a welding position, the piston rod 242a is retracted to separate the power supply terminal 178 from the power receiver terminal 182. Therefore, the swing frame 156 can be turned smoothly.

With the electric energy supplying apparatus according to the first embodiment, the power receiver terminal of the swingable resistance welding gun and the power supply terminal are separably connected by the connecting means which has the actuator. When the resistance welding gun is tilted to avoid physical interference with the workpiece, the resistance welding gun is not electrically connected to the power supply unit. Therefore, the workpiece can be moved to locate a new welding spot in position without being obstructed by the power supply unit. Heretofore, the power cable has a limited current capacity because it has to be flexible, posing a limitation on the process of welding galvanized steel sheets. According to the present invention, however, a power cable can be used which has a current capacity large enough to carry a welding current for welding galvanized steel sheets.

With the electric energy supplying apparatus according to the second embodiment, to connect the power receiver terminal of the swingable resistance welding gun and the power supply terminal to each other, the power receiver terminal is gripped by the clamp means on the power supply unit which clamp means is driven by the actuator. When the power receiver terminal is gripped, a welding current is supplied from the power supply unit to the power receiver terminal to weld the workpiece. When the workpiece is not welded, the power receiver terminal is unclamped from the clamp means. Therefore, the resistance welding gun can freely be tilted without being obstructed when the movable and fixed gun arms are turned. The power cable for carrying a large welding current may be increased in thickness without concern over the magnitude of the flexibility thereof. Accordingly, the power cable is free of undesirable design limitations.

With the electric energy supplying apparatus of the third embodiment, the power supply terminals on the fixed frame connected to the power cable and the power receiver terminals on the swing frame supporting the resistance welding guns are separably connected by the actuator. Even if the power cable is thicker, less flexible, and heavier in order to carry a greater welding current, the resistance welding guns can be retracted from the workpiece smoothly without being obstructed by the power cable.

Although certain preferred embodiments have been shown and described, it should be understood that many changes and modifications may be made therein without departing from the scope of the appended claims.

What is claimed is:

1. A method of supplying electric energy to a tiltable resistance welding gun having a pair of electrodes for gripping a workpiece and effecting resistance welding thereon, said method comprising the steps of:
   tilting said resistance welding gun to grip said workpiece between said pair of electrodes, wherein tilting of said resistance welding gun moves a power receiver terminal mounted thereon from a first position to a second position adjacent a power supply terminal;
   displacing said power supply terminal to connect said power receiver terminal and said power supply terminal to each other after the electrodes have gripped the workpiece therebetween;
   supplying a welding current from said power supply terminal to said power receiver terminal;
   displacing said power supply terminal to disconnect said power receiver terminal and said power supply terminal from each other; and
   tilting said resistance welding gun to separate said electrodes from said workpiece after said power receiver terminal and said power supply terminal have been disconnected from each other, wherein tilting of said resistance welding gun moves said power receiver terminal from said second position to said first position.

2. An apparatus for supplying electric energy to a tiltable resistance welding gun having a pair of electrodes for gripping a workpiece and effecting resistance welding thereon, said apparatus comprising;
   a power receiver terminal fixed to said welding gun, said power receiver terminal being movable from a first position to a second position in response to a tilting movement of said welding gun;
   a power supply unit including a flexible electrically conductive member adapted to be connected to a power supply;
   connecting means disposed adjacent said second position and connected to said power supply unit, said connecting means being drivable by an actuator so as to be connected to said power receiver terminal of the resistance welding gun at said second position after said welding gun is brought into an operative position about the workpiece and disconnected from said power receiver terminal before the welding gun is brought out of said operative position.

3. An apparatus according to claim 2, wherein said power receiver terminal comprises a wedge-shaped terminal, and said connecting means comprises a tulip-type connector mechanism linearly movable by said actuator into and out of engagement with said wedge-shaped terminal.

4. An apparatus according to claim 3, further including a member supporting said actuator and a damper spring supporting said member.

5. An apparatus according to claim 2, wherein said electrically conductive member comprises a pair of laminated copper sheet members, said laminated copper sheet members being curved in opposite directions.

6. An apparatus for supplying electric energy to a tiltable resistance welding gun having a pair of electrodes for gripping a workpiece and effecting resistance welding thereon, said apparatus comprising;
   a power receiver terminal fixed to the resistance welding gun, said power receiver terminal being movable from a first position to a second position in response to a tilting movement of the resistance welding gun;
   clamp means disposed adjacent said second position and drivable by an actuator for gripping said power receiver terminal at said second position; and
   means for supplying a welding current from said clamp means to said power receiver terminal while said power receiver terminal is being gripped at said second position by said clamp means.

7. An apparatus according to claim 6, wherein said actuator comprises a cylinder, said clamp means comprising a fixed gripping member and a movable gripping member movable toward and away from said fixed gripping member by said cylinder, said fixed and movable gripping members having respective electrodes on inner surfaces thereof for gripping said power receiver terminal therebetween.

8. An apparatus for supplying electric energy to a resistance welding gun, comprising:
   a swing frame supporting the resistance welding gun thereon;
   a fixed frame on which said swing frame is swingably supported;

a power supply terminal mounted on said fixed frame and connected to a power cable extending from a power supply;

a power receiver terminal mounted on said swing frame and engageable with and disengageable from said power supply terminal;

an electrically conductive member extending from said power receiver terminal to said resistance welding gun; and an actuator for angularly moving said swing frame and said power receiver terminal mounted thereon through a predetermined angle;

wherein said power supply terminal and said power receiver terminal are fixed to said fixed and movable frames, respectively, so that said power supply terminal and said power receiver terminal can be brought into and out of engagement with each other in response to swinging movement of said swing frame.

9. An apparatus for supplying electric energy to a resistance welding gun, comprising:

a swing frame supporting the resistance welding gun thereon;

a fixed frame on which said swing frame is swingably supported;

a first terminal mounted on said fixed frame and connected to a power cable extending from a power supply;

a second terminal mounted on said swing frame and movable therewith from a first position to a second position adjacent said first terminal, said second terminal being engageable with and disengageable from said first terminal;

an electrically conductive member extending from said second terminal to said resistance welding gun;

a first actuator for angularly moving said swing frame through a predetermined angle; and a second actuator for displacing and connecting said first terminal to said second terminal at said second position, after said swing frame is angularly moved into a predetermined position by said first actuator.

10. An apparatus according to claim 9, wherein said second actuator comprises a cylinder attached to a vertically displaceable attachment member movable on and along a guide rod, said attachment member being movable by a distance limited by a pin mounted on said guide rod.

11. An apparatus for supplying electric energy to a tiltable resistance welding gun comprising a pivotable welding gun body and having a movable arm member and a fixed arm member fixed with respect to said welding gun body, said welding gun body and said fixed and movable arm members being movable between operative and inoperative positions, said apparatus comprising:

electrode means mounted to each said fixed arm member and said movable arm member for contacting the workpiece when said welding gun body and said arm members are in an operative position;

a holder member electrically connected to at least one of said fixed arm member and said moveable arm member, said holder member being connected to and movable with said welding gun body;

a power supply terminal;

a power receiver terminal supported by said holder member, for selectively supplying power to each of said fixed and movable arm members, said power receiver terminal being movable from a first position to a second position adjacent said power supply terminal, said power supply terminal being removably connected to said power receiver terminal for selectively supplying power thereto;

means for selectively displacing said power supply terminal to engage said power receiver terminal wherein said means for selectively displacing is only enabled when said welding gun body is in an operative position and said power receiver terminal is in said second position, thereby preventing said power supply terminal from interfering with said power receiver terminal when said tiltable welding gun is moved between operative and inoperative position.

12. The apparatus according to claim 11, wherein in said operative position said power receiving terminal is electrically connected to said power supply terminal and in said inoperative position said power receiving terminal is disengaged from said power supply terminal.

13. The apparatus according to claim 11, wherein said means for selectively engaging said power supply terminal comprises a hydraulic piston for bidirectionally moving said power supply terminal a predetermined distance into and out of engagement with said power receiving terminal.

* * * * *

UNITED STATES PATENT AND TRADEMARK OFFICE
CERTIFICATE OF CORRECTION

PATENT NO. : 5,063,278
DATED : November 5, 1991
INVENTOR(S) : Mitsuo KONNO, Hisashi NORO and Naoteru KATSURA It is certified that error appears in the above-identified patent and that said Letters Patent is hereby corrected as shown below:

On the title page, under the heading, item [75] inventors, change

"Naotero Katsura" to --Naoteru Katsura--

Signed and Sealed this

Twenty-seventh Day of April, 1993

*Attest:*

MICHAEL K. KIRK

*Attesting Officer*     *Acting Commissioner of Patents and Trademarks*